United States Patent
Vendelin

(10) Patent No.: US 9,043,299 B2
(45) Date of Patent: May 26, 2015

(54) SYSTEM FOR IMAGE STORING

(75) Inventor: Jüri Vendelin, Tallinn (EE)

(73) Assignee: A JA U MAJANDUSTARKVARA OU, Tartu (ES)

( * ) Notice: Subject to any disclaimer, the term of this patent is extended or adjusted under 35 U.S.C. 154(b) by 2584 days.

(21) Appl. No.: 11/510,710

(22) Filed: Aug. 28, 2006

(65) Prior Publication Data

US 2008/0091751 A1   Apr. 17, 2008

(51) Int. Cl.
G06F 17/30 (2006.01)

(52) U.S. Cl.
CPC .................... *G06F 17/3028* (2013.01)

(58) Field of Classification Search
USPC ................................ 707/661, 706
See application file for complete search history.

(56) References Cited

U.S. PATENT DOCUMENTS

| 6,704,464 B2 * | 3/2004 | Ohdate et al. ............... 382/305 |
| 7,571,117 B1 * | 8/2009 | Nakajima ...................... 705/26 |
| 2005/0050038 A1 | 3/2005 | Kobayashi et al. |

FOREIGN PATENT DOCUMENTS

| JP | 2004005761 | 1/2004 |
| JP | 2004234228 | 8/2004 |

* cited by examiner

*Primary Examiner* — Joshua Bullock
(74) *Attorney, Agent, or Firm* — Birch, Stewart, Kolasch & Birch, LLP

(57) ABSTRACT

A system for image storing contains image downloading tool from image sources, system administering tool, screen for displaying downloaded images and image archive comprising the units of archiving images to the archive and searching images from archive. The purpose of the proposed system is to create an image archiving system, in which the relevant criteria are: the objects represented on the image; what properties criteria the image corresponds to and; how users group images. For this reason a clear distinction is made between a priory categories, including ON- and IN- keywords, and matrix categories when archiving images.

14 Claims, 5 Drawing Sheets

SYSTEM FOR IMAGE STORING

FIELD OF THE INVENTION

The present invention relates to system for image storing. In particular, the present invention relates to image categorizing, archiving and searching.

BACKGROUND OF THE RELATED ART

The age of digital cameras is generated huge amount of digital images. Thus there are known many different systems for archiving and searching images. From the well-known solutions the closest to the present invention are for example solutions, which are described in United States and Japanese patent documents US2005050038, JP2004234228, JP2004005761.

For example in US patent application US2005050038 is described information search apparatus and method wherein a search request input processing unit holds an input query word in a query word holding unit. An associative word unfolding processing unit acquires associative words in association with the query word held in the query word holding unit with reference to an associative word dictionary. An image content search-processing unit using associative words makes a keyword search of image information on the basis of the obtained associative words and the query word. A sensory pattern unfolding processing unit obtains the query word and sensory patterns corresponding to associative words of the query word, and searches image information using feature amounts of the obtained sensory patterns. A search result integration-processing unit integrates the search results obtained by the image content word search processing unit and sensory pattern search processing unit.

In Japanese patent application JP2004234228 is described image search device and method to streamline the operation of assigning a keyword to an image by detecting an object in the image when the image is classified in an image search device. The image search device comprises image storing means for saving an image to be classified and searched for in a database along with a keyword, object recognizing means for recognizing a given object in the input image, a keyword presenting means for presenting keywords related to the object if the object recognizing means recognize the object, and an object information inputting means for checking, adding to or correcting the keywords presented by the keyword presenting means.

In Japanese patent application JP2004005761 is described keyword extraction and searching system. To recognize a character based on image information read from a description document and a paper document to automatically extract a character recognition result proposal sequence, to automatically extract a keyword proposal based on the character recognition result proposal sequence, to automatically select a keyword from the keyword proposal, based on reliability, significance and a field, and to automatically extract the keyword from the description document and the image information, as to keyword extracting/search system for extracting the keyword from the image information of the document. This system is provided with a character recognizing part for recognizing the character based on the image information of the original document to generate the character recognition result proposal sequence, a keyword extracting part for extracting, as the keyword proposal, one consistent with by retrieving a word dictionary as to the proposal sequence, or one having a value of a prescribed threshold value or more by finding reliability of the keyword based on the reliability of the individual proposal sequence, and a keyword selecting part for selecting the keyword out of the keyword proposals when the significance corresponding to a position in the original document of the each keyword proposal is the prescribed threshold value or more.

SUMMARY OF THE INVENTION

The purpose of the proposed system is to create an image (digital photo, picture ect.) archiving system, in which the relevant criteria are:
the objects represented on the image;
what properties criteria the image corresponds to and;
how users group images.

For this reason a clear distinction is made between a priory categories, including ON- and IN- keywords, and matrix categories when archiving images.

In case of a priory categories the images are grouped subconsciously. Every visible object corresponds to a verbal expression—a word. The word as the analogue for an object is created in the brain "automatically"—a priory. Human have the ability to spontaneously give a name and properties to a visual object. This mechanism is similar in all people. The word as a semiotic analogue to a visual object exists in every language.

Images are grouped into "a priory" categories by name and properties; therefore there exists an object-based keyword on the picture and property-based keyword in the picture. A priory archiving presupposes that the photo or optical image receives the correct verbal equivalent.

The ON- keyword is created during logical "reading" of the photograph. In this process the object is recognized and named, the question presented for this is "what is it?". The IN-keyword is created during associative "reading" of the photograph. In addition to recognition and naming the object its properties are distinguished, this process is also subconscious and is clearly associational and individual. Every person can have different impressions when looking at the same photograph.

When archiving a photo the ON- and IN-keywords have to be assigned for every image, on the bases of these keywords the image are grouped into a priory categories. These categories are necessary for searching for a image, where the search is performed for the actual image in reality (archive) that corresponds to the image description set as search criteria.

Matrix category views the image as a separate object. User can define this category they where the image is not grouped by the object it represents but according to it's use. This is a creative category. When an image is linked with this category it will be assigned a call name that is also made by the user.

The list of definitions used in the document:

| | |
|---|---|
| A priory category | Category, where images are grouped based on the objects represented on the image and properties of image. User cannot create a priory categories, these are given by the system. |
| Matrix category | Personal categories created according to user needs. User can create these Matrix categories themselves. |
| ON-keyword | Object based keyword for "a priory" categories that will be ascribed to the imag when archiving it. |
| IN-keyword | Properties based keyword for a priory category that will be ascribed to the image when archiving it. |
| Call name | Matrix category keyword that will be added by the user and which can be ascribed to the image when archiving them. When adding a call name a folder with its name will be created under the designated matrix category. |
| Image signature | Information linked to the image. The signature is filled in when archiving a image. Image signature comprises of the following fields: where, when, who/what, author. |

DETAILED DESCRIPTION OF THE INVENTION

The technical solution of present invention includes an image-downloading tool from image sources, system administering tool, screen for displaying images and image archive.

Figure 1:
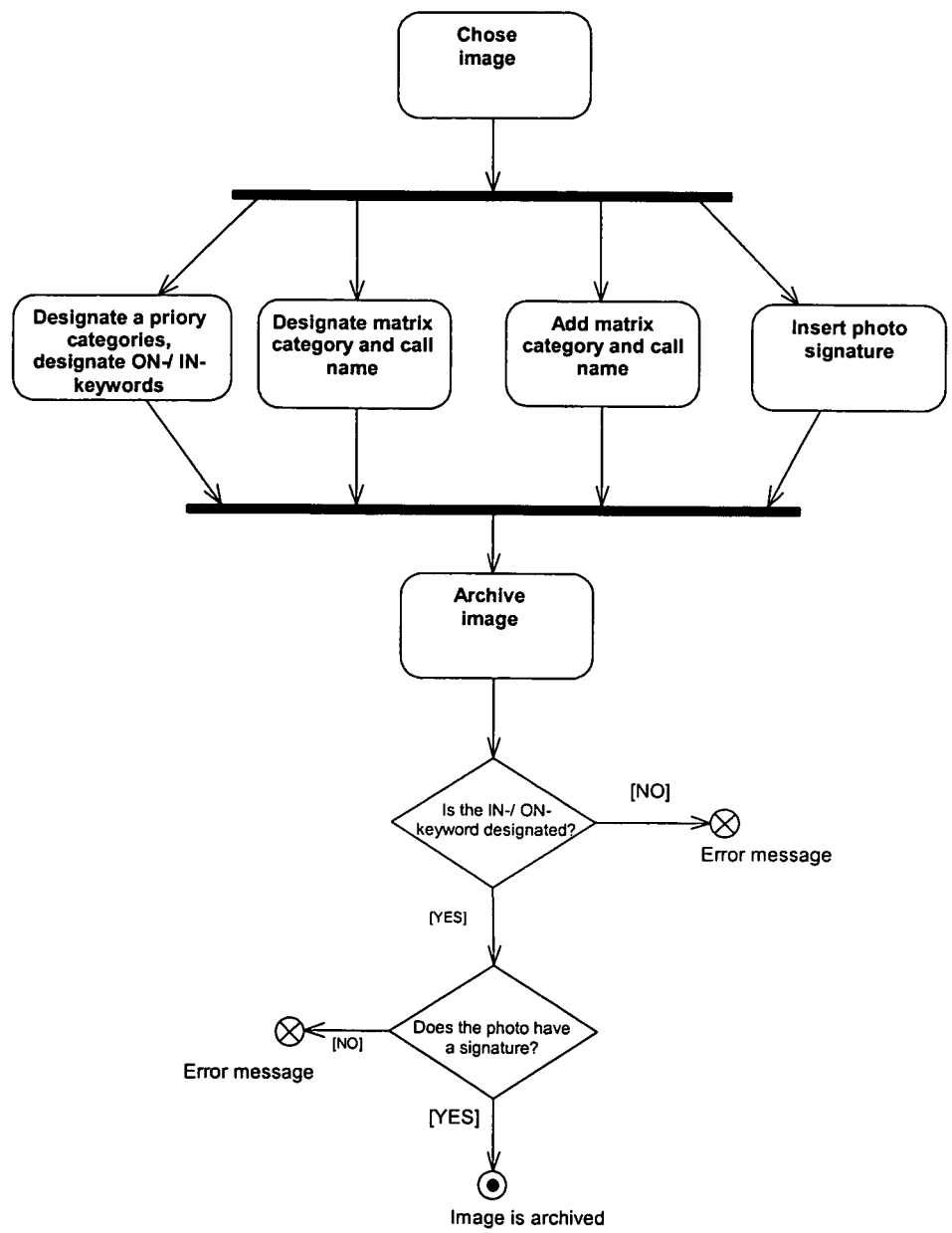
FIG. 1 is a block diagram showing details of photo archiving.

The invention will now be described in more detail with reference to exemplifying embodiments thereof and also with reference to the accompanying drawings. FIG. 1 illustrates archiving process of the present image storing system.

When the archiving unit of the system is opened the image (digital photo, picture, etc) downloaded first will be automatically displayed on the center of the screen. At the same time user has the right to choose the image they wish to start archiving first.

In order to link the photo with a priory categories user must designate ON- and IN-keywords. The system will link the photo with these keywords and then mark the category the photo will be saved under within a priory category list.

In order to link a photo with matrix category user chooses the matrix category they wish the photo to be linked with. System will display the call names existing within this category in a drop down menu and user will choose the appropriate one. After choosing the call name system will link the photo to that call name.

If the appropriate matrix category is not found user will add a new matrix category. System will save this matrix category and this category will then be displayed in matrix category list. The new category will also be displayed on the archiving page in the matrix category list.

If the appropriate call name is not found user will add a new call name in the designated field and save it. When the call name is added a folder with that name is created under the designated matrix category and this call name will be henceforth displayed under that matrix category.

User enters photo signature filling in the following fields: Where, When, Who/What, Author. User archives the photo by choosing the command Archive.

System checks if the photo is linked to minimum 3 ON- and minimum 1 IN- keywords. If this is so system will archive the photo. If this is not so system will display an error message. The archived photo will be saved into the archive and is linked with designated categories, keywords and call names.

System checks if the photo signature has been entered. If it is so system will archive the photo. If this is not so system will display an error message. The archived photo will be saved into the archive and is linked with designated categories, keywords and call names.

Figure 2:
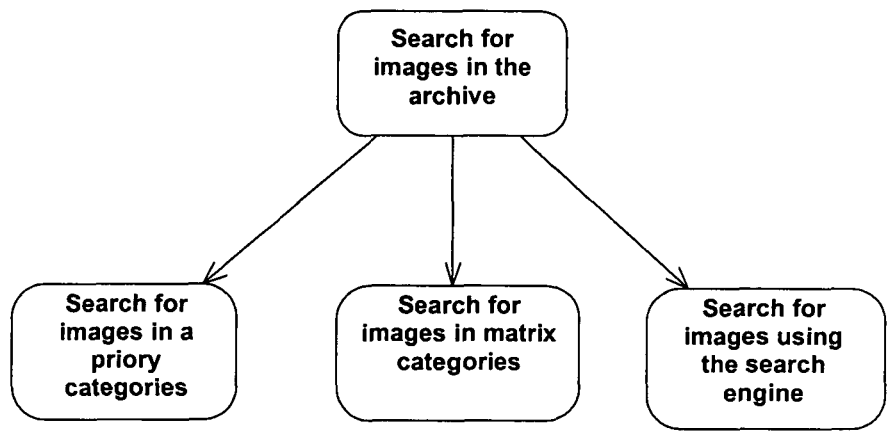
FIG. 2 is a block diagram showing details of search unit of searching for photos in the archive.
Figure 3:
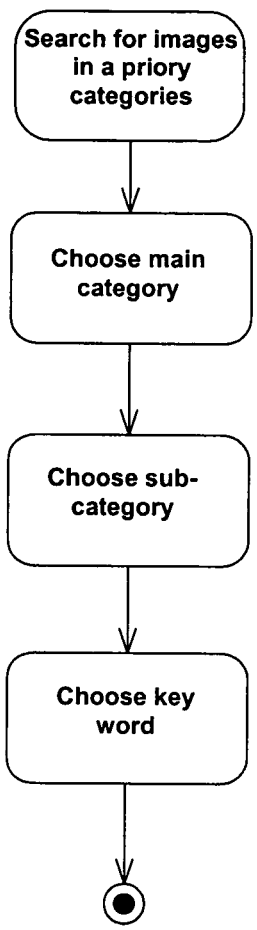
FIG. 3 is a block diagram showing details of searching for photos in priory categories.
Figure 4:
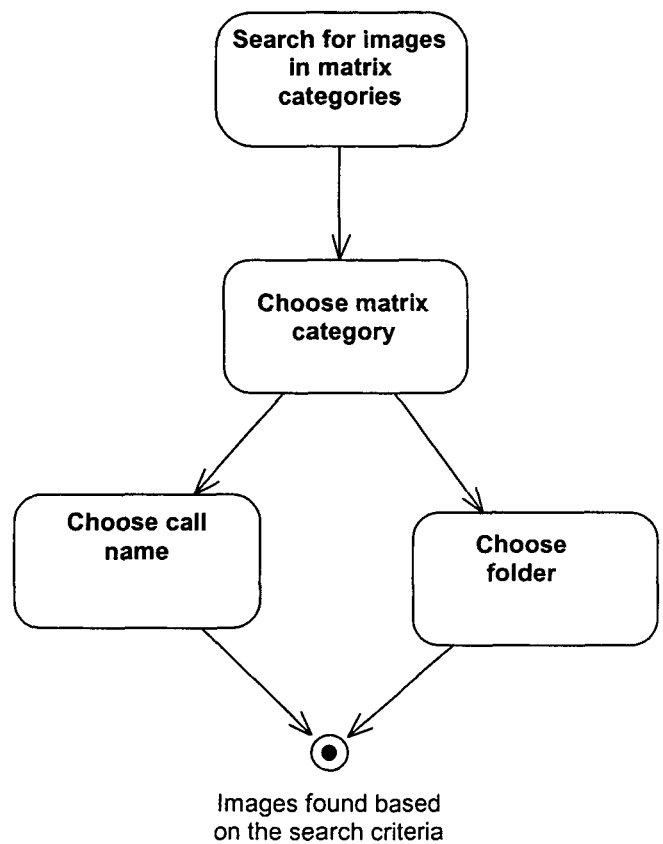
FIG. 4 is a block diagram showing details of searching for photos in matrix categories.
Figure 5:
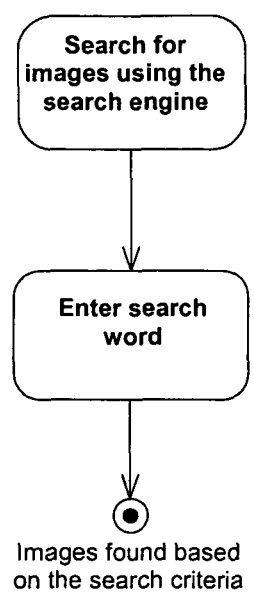
FIG. 5 is a block diagram showing details of searching for photos using the search engine.

FIG. 2 illustrates search unit for searching photos from the archive. User can search for a photo in the archive by priory categories, matrix categories or using the search engine.

For searching using a priory categories (graph 3) user must choose the suitable main a priory category. System opens the chosen category tree and will display previews for all photos belonging into the chosen main category.

User chooses the suitable sub-category from the category tree. System opens the chosen category keywords and will display previews for all photos belonging into the chosen sub-category.

User chooses the suitable keyword from the sub-category keywords listed. System will display previews for all photos belonging into the chosen keyword.

For searching photos in matrix categories (graph 4) user must choose the suitable matrix category. System opens the chosen category tree and will display all call names belonging into this category as folders.

User chooses the suitable folder from the list of folders displayed and opens it. System will display previews for all photos in the folder.

For searching photos using the search engine (graph 5) user must enter one or more search words into the search field. System will perform a search according to entered search criteria and will display previews for all photos corresponding to the given criteria:
 a. a priory categories,
 b. a priory sub-categories,
 c. keywords in a priory categories,
 d. matrix categories,
 e. call names in matrix categories and
 f. photo signatures.

The invention claimed is:

1. An image archiving system comprising:
    a storing unit comprising:
        a selector module for choosing an image manually or automatically, and displaying the image;
        a processing module for designating and adding categories, keywords and call names, linking images with categories, keywords and call names; and
        a checking module for ascertaining compliance with linking and archiving requirements; and
    a retrieving unit comprising:
        a search module for a priori categories; and
        a search module for matrix categories,
    wherein said a priori categories are used to group images based on objects depicted in the images, and image properties, and
    wherein matrix categories are user-created and user-defined.

2. A system according to claim 1, wherein said a priori categories are automatically specified by the system and said matrix categories are manually selectable.

3. A system according to claim 1, wherein said designated keywords are specified by the system.

4. A system according to claim 3, wherein said designated keywords are object based ON-keywords and property based IN-keywords.

5. A system according to claim 1, wherein said designated keywords are manually selectable.

6. A system according to claim 5, wherein said designated keywords are object based ON-keywords and property based IN-keywords.

7. A system according to claim 1, wherein added call names are manually selectable.

8. A system according to claim 1, further comprising an image signature containing data regarding the details of the image including where, when, who/what and author.

9. A system according to claim 1, wherein keywords are linked with a priori categories, and call names are linked with matrix categories.

10. A system according to claim 1, wherein the checking module checks that at least three ON-keywords, at least one IN-keyword and signature have been designated.

11. A system according to claim 1, wherein said search module for a priori categories is configured to:
- choose an a priori category;
- open said category tree and display corresponding previews of images;
- choose a sub-category;
- open keywords of corresponding subcategory and display previews of related images;
- choose a keyword; and
- display found images.

12. A system according to claim 1, wherein said search module for matrix categories is configured to:
- choose a matrix category;
- open said category tree and display folders of call names;
- choose and open folders of call names; and
- display found images.

13. A system according to claim 1, wherein said query based search module is configured to:
- enter at least one search word into the search field;
- perform a search according to entered criteria; and
- display previews of images corresponding to the given criteria.

14. A system according to claim 13, wherein said search fields comprising the fields of a priory categories, a priory sub-categories, keywords in a priory categories, matrix categories, and call names in matrix categories.

* * * * *